(12) United States Patent
Vijayaraghavan et al.

(10) Patent No.: US 7,925,913 B1
(45) Date of Patent: Apr. 12, 2011

(54) CDR CONTROL ARCHITECTURE FOR ROBUST LOW-LATENCY EXIT FROM THE POWER-SAVING MODE OF AN EMBEDDED CDR IN A PROGRAMMABLE INTEGRATED CIRCUIT DEVICE

(75) Inventors: Divya Vijayaraghavan, Mountain View, CA (US); Michael Menghui Zheng, Fremont, CA (US); Lana May Chan, Mountain View, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 839 days.

(21) Appl. No.: 11/857,141

(22) Filed: Sep. 18, 2007

Related U.S. Application Data

(60) Provisional application No. 60/916,056, filed on May 4, 2007.

(51) Int. Cl.
*G06F 1/00* (2006.01)
*H04L 7/00* (2006.01)
*H04L 7/02* (2006.01)

(52) U.S. Cl. ......... 713/500; 713/501; 375/355; 375/359

(58) Field of Classification Search .................. 713/500, 713/501; 375/355, 359
See application file for complete search history.

(56) References Cited

U.S. PATENT DOCUMENTS

| | | | |
|---|---|---|---|
| 7,089,444 B1 * | 8/2006 | Asaduzzaman et al. | 713/600 |
| 7,292,070 B1 * | 11/2007 | Park et al. | 327/47 |
| 7,352,835 B1 * | 4/2008 | Asaduzzaman et al. | 375/359 |
| 2005/0281366 A1 * | 12/2005 | Shachar et al. | 375/376 |
| 2006/0198482 A1 * | 9/2006 | Meltzer et al. | 375/376 |
| 2006/0224339 A1 * | 10/2006 | Kim et al. | 702/66 |
| 2007/0121772 A1 * | 5/2007 | Wada | 375/371 |
| 2008/0123792 A1 * | 5/2008 | Prete et al. | 375/362 |
| 2008/0137790 A1 * | 6/2008 | Cranford et al. | 375/357 |

* cited by examiner

*Primary Examiner* — Vincent T Tran
(74) *Attorney, Agent, or Firm* — Ropes & Gray LLP; Jeffrey H. Ingerman

(57) ABSTRACT

Clock data recovery (CDR) circuitry of a high-speed serial interface on a programmable integrated circuit device toggles, during the electrical idle period of the receiver of the interface, between its "lock-to-reference" ("LTR") state and its normal "lock-to-data" ("LTD") state. Whenever during this toggling mode the CDR circuitry toggles to the LTD state, it remains in that state for a predetermined interval and then returns to the LTR state, unless, while it is in the LTD state, it receives a signal from elsewhere in the receiver that data have been received and byte synchronization has occurred. The predetermined toggling interval preferably is long enough to obtain an LTR lock to minimize frequency drift, but short enough to avoid unnecessary delay in detection of the synchronization signal. Preferably, this interval is programmable by the user within limits determined by the characterization of the programmable device. Unreliable analog signal detection is thereby avoided.

25 Claims, 3 Drawing Sheets

CDR CONTROL ARCHITECTURE FOR ROBUST LOW-LATENCY EXIT FROM THE POWER-SAVING MODE OF AN EMBEDDED CDR IN A PROGRAMMABLE INTEGRATED CIRCUIT DEVICE

CROSS REFERENCE TO RELATED APPLICATION

This claims the benefit of commonly-assigned U.S. Provisional Patent Application No. 60/916,056, filed May 4, 2007, which is hereby incorporated by reference herein in its entirety.

BACKGROUND OF THE INVENTION

This invention relates to electrical idle exit detection for clock-data recovery circuitry in a high-speed serial interface of a programmable integrated circuit device such as a programmable logic device.

As it becomes more important to minimize power consumption in programmable logic devices with embedded high-speed serial interfaces, it is desirable to use power-saving modes provided by the serial protocols supported by the devices to the fullest extent possible. One such mode is the PCI Express L0 Standby (L0s) low-power mode in which a link is placed in electrical idle when a lull in packet traffic is anticipated. This mode is intended for frequent usage and hence necessitates robust low-latency electrical idle entry and exit mechanisms in order to meet the performance demands of high-speed applications. Electrical idle entry and exit have heretofore been detected by an analog "signal detection" approach in which the signal detected by the receiver is compared to a protocol-defined voltage threshold.

This approach has been shown to be increasingly unreliable, especially in the context of emerging protocols such as PCI Express Gen 2 in which the receiver sensitivity at 5 Gb/s is 120 mV and the idle detection threshold is 175 mV. Specifications such as PCI Express Gen 2 have therefore been enhanced to include electrical idle entry inference mechanisms that are implemented in the digital domain and reduce or eliminate dependency on the "signal detection" mechanism. These idle entry mechanisms generally are easily implemented.

However, the corresponding mechanisms specified to infer electrical idle exit, such as the detection of a recurring low frequency pattern of successive K28.7 symbols prior to L0s exit, are designed to be implemented in the analog domain and necessitate a bit lock time of less than 32 ns, which may not be feasible for the vast majority of clock data recovery (CDR) implementations. Nevertheless, whatever mechanism is used must meet the low-power mode exit latency specified by the relevant protocol. Under PCI Express, the low-power mode exit latency should not exceed 4 μs for PCI Express Ge 1, or 2 μs for PCI Express Gen 2. And in practice, most current applications demand low-power mode exit latencies about 1/16 of those maxima, or as low as about 125 ns.

It would be desirable to be able to provide a CDR control architecture for low-latency electrical idle exit detection which is applicable to all CDR implementations, and which is not based on the unreliable "signal detection" mechanism described earlier.

SUMMARY OF THE INVENTION

Rather than relying on analog signal detection to indicate to CDR circuitry that an associated receiver has exited from an electrical idle period, in accordance with the present invention CDR circuitry of a high-speed serial interface on a programmable integrated circuit device toggles, during the electrical idle period of the receiver of the interface, between its "lock-to-reference" ("LTR") state and its normal "lock-to-data" ("LTD") state. Whenever during this toggling mode the CDR circuitry toggles to the LTD state, it remains in that state for a predetermined interval and then returns to the LTR state, unless, while it is in the LTD state, it receives a signal from elsewhere in the receiver that data have been received and byte synchronization, which is a digital process, has occurred. The predetermined toggling interval preferably is long enough to obtain an LTR lock to minimize drift in the frequency of a clock recovered before the receiver entered the electrical idle period, but short enough to avoid unnecessary delay in detection of the synchronization signal. Preferably, this interval is programmable by the user within limits determined by the characterization of the programmable logic device.

Thus, in accordance with the present invention, there is provided a method of operating clock data recovery circuitry in a serial interface of a programmable integrated circuit device. The serial interface operates under a serial communications protocol that includes a signal indicating entry into an idle period. The method includes, during the idle period, operating the clock data recovery circuitry in a mode in which the clock data recovery circuitry toggles between a lock-to-data state and a lock-to-reference state. A synchronization signal is asserted upon receipt of data following the idle period. In each lock-to-data interval during toggling of the clock data recovery circuitry, assertion of that synchronization signal is checked for. In the absence of the synchronization signal during the lock-to-data interval, toggling of clock data recovery circuitry is continued, while on detection of the synchronization signal, toggling of the clock data recovery circuitry is discontinued, and the clock data recovery circuitry is maintained in the lock-to-data state.

Clock data recovery circuitry operating according to the method, and a programmable integrated circuit device incorporating the clock data recovery circuitry, also are provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

In a common implementation, a high-speed serial transceiver is divided into a physical medium attachment (PMA) portion or module which communicates with outside devices, and a physical coding sublayer (PCS) portion or module which performs serial processing of data, for transmission to, or that is received from, those outside devices. CDR circuitry typically is part of the PCS.

It is known to provide CDR circuitry with (a) a Lock-to-Data (LTD) state which is the normal operational state of the CDR circuitry, in which the circuitry locks to, and recovers the clock from, incoming data, and (b) a Lock-to-Reference (LTR) state which is a state in which the circuitry is not trying to perform its LTD function, but is locked to its own reference clock to minimize drifting to avoid providing a false output. The digital CDR control architecture of the present invention preferably drives the LTR and LTD outputs to the Physical Medium Attachment (PMA) in such a way as to align the lock-to-reference period of the CDR with the electrical idle period associated with the low-power mode of the device receiver, such as the PCI Express Receiver L0s state.

The CDR control architecture of the present invention preferably also ensures that upon exit of the receiver from the electrical idle state, the transitioning of the CDR to the "Lock-to-Data" state occurs as close as possible to the start of the received data, in order to achieve bit and byte lock with the minimum possible latency.

Figure 1:
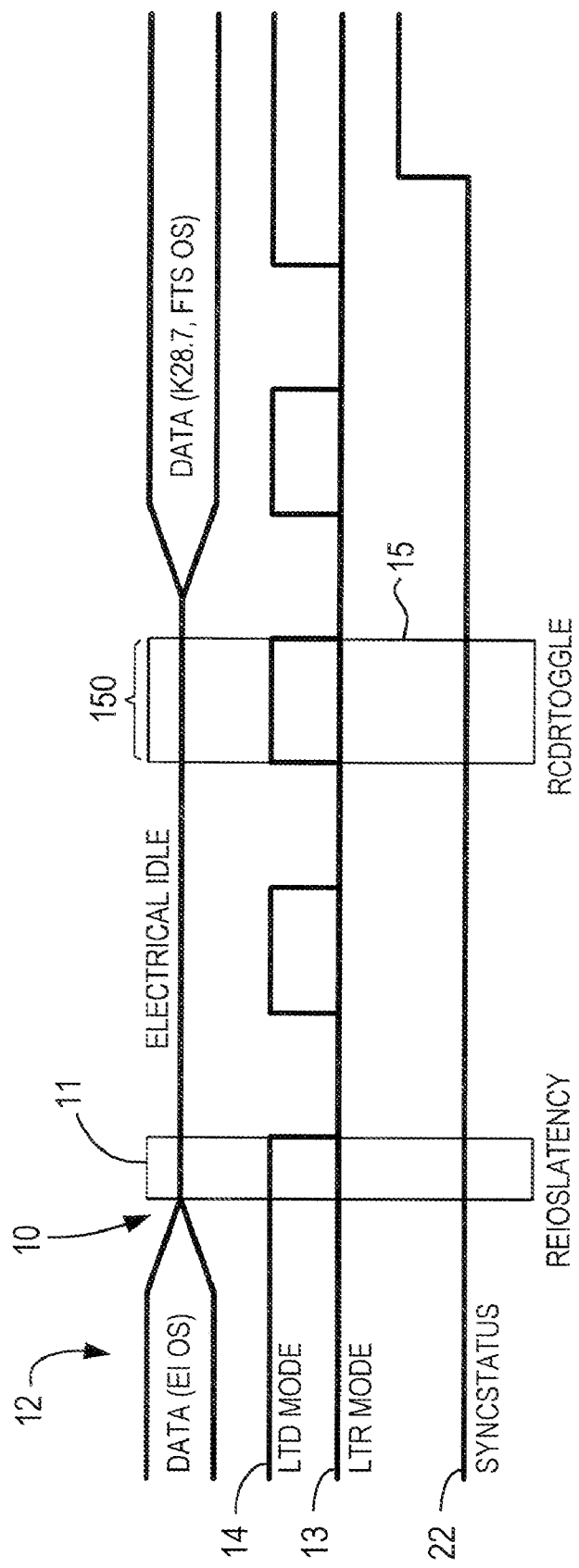
FIG. 1 shows the sequence of events in CDR circuitry controlled in accordance with a preferred embodiment of the present invention, implemented for the PCI Express protocol.

Entry into the LTR state preferably occurs when, as seen in FIG. 1, the controller of the CDR circuitry drives an LTD-to-LTR transition on detection, in the data, of a delimiting pattern that indicates that a period of electrical idle will be following. For example, in the PCI Express protocol, that pattern is known as the Electrical Idle Ordered Set (EIOS). For another protocol, the delimiting pattern would be a pattern prescribed by that protocol. Detection of the delimiting pattern preferably is performed within the CDR controller 21 (FIG. 2), but the pattern—and the data ahead of it—preferably should be allowed to propagate through the remainder of the PCS 20 before the CDR circuitry enters the LTR state. The time required for that to happen may be a function of the characteristics of the PCS, which in a programmable logic device may vary from one user design to another. Therefore, a programmable delay (REIOSLatency) preferably is provided, which allows the user to control when the transition to the LTR state occurs, so that it does not occur either prematurely, or unnecessarily late.

Once the CDR circuitry, on detecting that the receiver has entered the electrical idle state, has itself entered its LTR state, the challenge is to have the CDR controller return the CDR circuitry to its LTD state as quickly as possible when the idle period of the receiver ends. In accordance with the present invention, while the receiver is in the electrical idle state, the CDR circuitry preferably will toggle between the LTR state and the LTD state at regular intervals. Exit from this toggling mode preferably occurs if, while the CDR circuitry is toggled to the LTD state, there is an indication that incoming data have been received and byte synchronization has occurred.

In a preferred embodiment, that indication is provided by a signal 22 from the word alignment module 23 of PCS 20. Signal 22, which may be known as SyncStatus, typically is asserted after receipt, in the incoming data, of four Fast Training Sequence (FTS) Ordered Sets, each of which includes a comma character (K28.5) and three Fast Training Sequences.

In accordance with a preferred embodiment of the invention, illustrated in FIG. 1 for a PCI Express embodiment, if CDR circuitry, controlled by controller 21, toggles during the receiver idle state (indicated at 10 upon passage of REIOSLatency delay 11 following receipt of EIOS signal 12) from LTR state 13 to LTD state 14 and, during the interval RCDRToggle 15 in which the toggling CDR circuitry is in LTD state 14, controller 21 does not detect assertion of the SyncStatus signal, controller 21 preferably will cause the CDR circuitry to remain in its toggling mode and toggle back to LTR 13 state until the next toggling interval 15 has elapsed.

However, if during the interval 15 in which the toggling CDR circuitry is in LTD state 14, controller 21 detects assertion of the SyncStatus signal 22, controller 21 preferably will cause the CDR circuitry to exit the toggling mode and to remain in LTD state 14 instead of toggling back to the LTR state 13.

The duration 150 of RCDRToggle toggling interval 15 should be long enough to obtain an LTR lock to minimize drift in the frequency of a clock recovered before the receiver entered the electrical idle period. However, the RCDRToggle interval duration 150 also must be short enough not to delay unnecessarily the detection of an asserted SyncStatus signal 22. Preferably, the RCDRToggle duration 150 is programmable by the user, taking into account the bit-lock duration of the receiver phase-locked loop in the serial interface 200, as well as any latency in the assertion of the SyncStatus signal 22 at the current data rate. These parameters are dependent in part the data themselves, and in part on device characterization, which can be determined by the manufacturer and provided to the user with recommendations on RCDRToggle programming.

Although, as stated above, according to the PCI Express protocol, SyncStatus signal 22 normally is asserted after receiving four FTS Ordered Sets, in accordance with the present invention, SyncStatus signal 22 could be asserted after receiving only two FTS Ordered Sets, so that exit from the low-power mode can occur faster. Preferably, the number of FTS Ordered Sets required before SyncStatus signal 22 is asserted is programmable by the user. Most preferably, the user is able to program that number to be either two or four.

Figure 2:
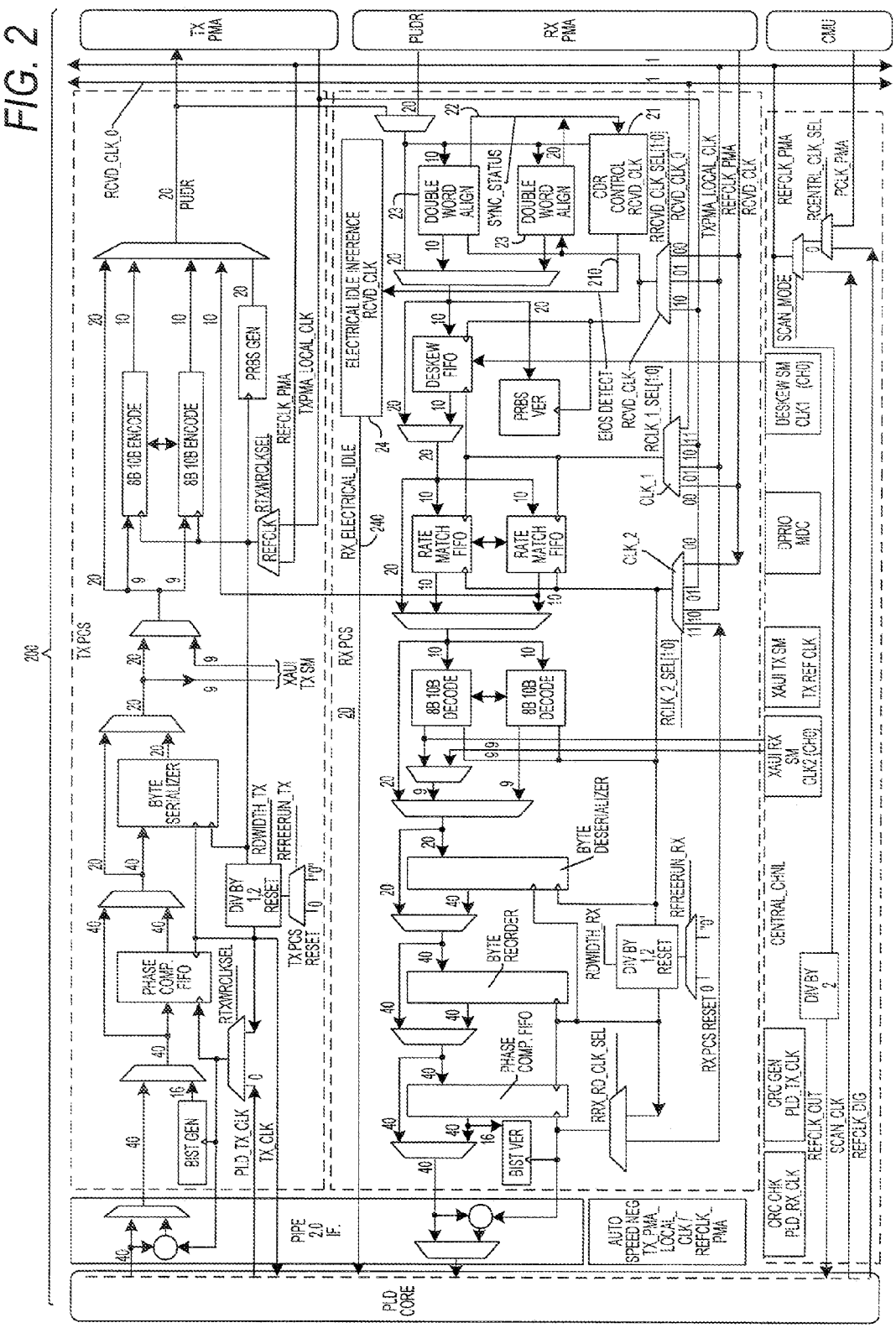
FIG. 2 shows the physical coding sublayer of a serial receiver incorporating a CDR control block in accordance with a preferred embodiment of the present invention.

FIG. 2 shows a receiver PCS 20 in a serial interface 200 incorporating the present invention. CDR Control block 21 receives the SyncStatus signal 22 from the PCS word alignment block(s) 23. An Electrical Idle Inference (EII) block 24 receives from CDR control block 21 a signal 210 indicating either that the EIOS signal has been detected in the incoming data (meaning that electrical idle has been entered) or that SyncStatus signal 22 has been detected (meaning that electrical idle has been exited). EII block 24 then changes the state appropriately of a signal RxElectricalIdle 240 which is used by the rest of the device. When the serial interface 200 is included in a programmable integrated circuit device such as a programmable logic device, instead of providing EII block 24 and CDR Control block 21 in the interface circuitry as hardware, either or both of EII block 24 and CDR Control block 21 could be implemented in programmable logic of the programmable device.

Figure 3:
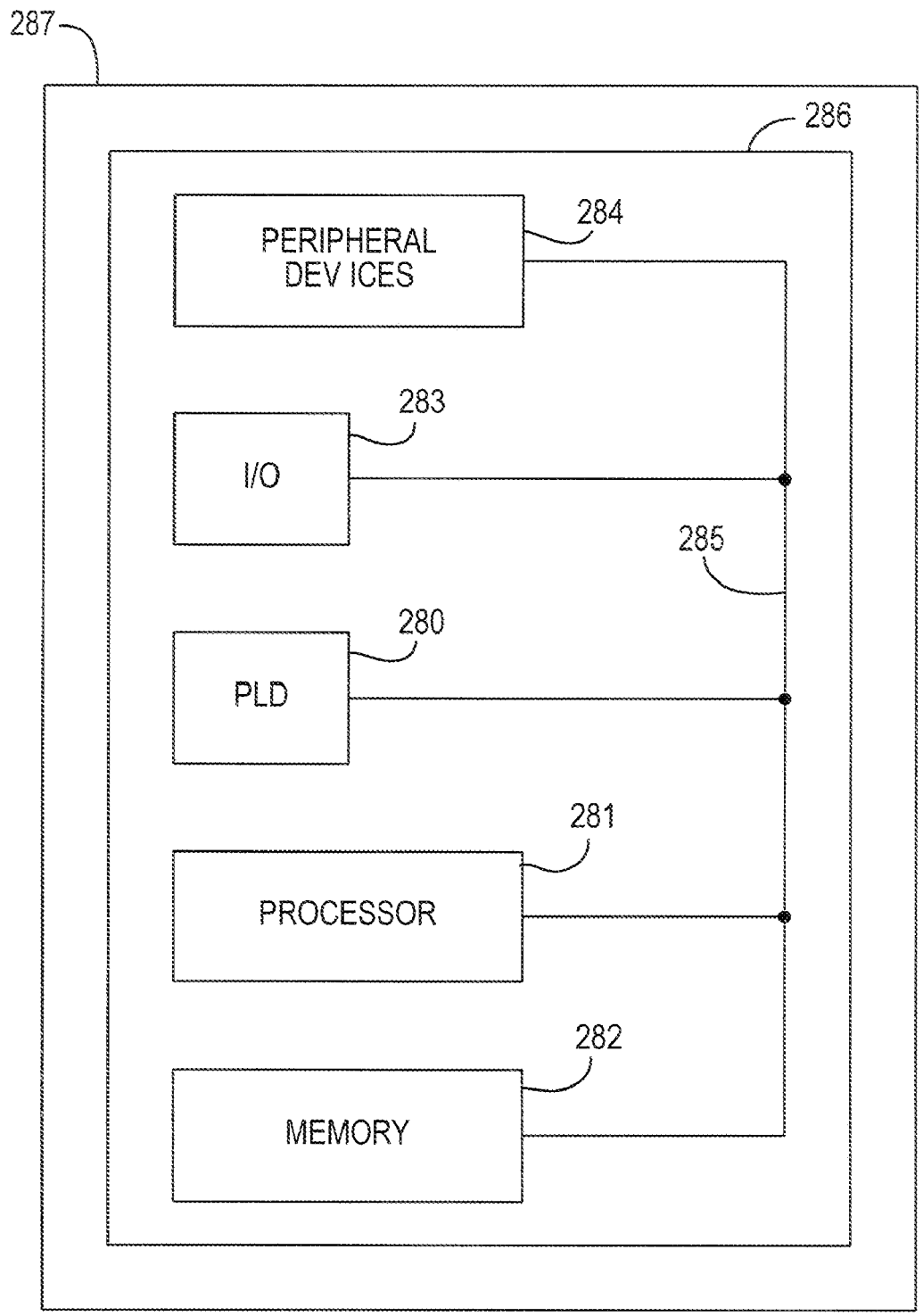
FIG. 3 is a simplified block diagram of an illustrative system employing a programmable logic device incorporating the present invention.

A PLD 280 incorporating such circuitry according to the present invention may be used in many kinds of electronic devices. One possible use is in a data processing system 900 shown in FIG. 3. Data processing system 900 may include one or more of the following components: a processor 281; memory 282; I/O circuitry 283; and peripheral devices 284. These components are coupled together by a system bus 285 and are populated on a circuit board 286 which is contained in an end-user system 287.

System 900 can be used in a wide variety of applications, such as computer networking, data networking, instrumentation, video processing, digital signal processing, or any other application where the advantage of using programmable or reprogrammable logic is desirable. PLD 280 can be used to perform a variety of different logic functions. For example, PLD 280 can be configured as a processor or controller that works in cooperation with processor 281. PLD 280 may also be used as an arbiter for arbitrating access to a shared resources in system 900. In yet another example, PLD 280 can be configured as an interface between processor 281 and one of the other components in system 900. It should be noted that system 900 is only exemplary, and that the true scope and spirit of the invention should be indicated by the following claims.

Various technologies can be used to implement PLDs 280 as described above and incorporating this invention.

Thus it is seen that a CDR control architecture, which enables devices to address the low latency electrical idle exit requirements of the power management modes supported by serial protocols such as PCI Express Gen 1 and Gen 2, has been provided. As shown, this invention may be implemented in hardware, or in programmable logic of programmable devices, including pre-existing devices, that lack hardware according to the invention.

The CDR control architecture of the invention eliminates the dependency on the analog signal detection mechanism in the PMA, which may be unreliable at data rates as low as 2.5 Gb/s, and therefore cannot be reliably utilized at 5 Gb/s or above. This architecture also is able to meet the maximum low-power mode exit latencies discussed above—i.e., 4 µs for PCI Express Gen 1, 2 µs for PCI Express Gen 2, and latencies about $1/16$ of those specified maximum values as required by current applications.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of operating clock data recovery circuitry in a serial interface of a programmable integrated circuit device, wherein said serial interface operates under a serial communications protocol that includes a signal indicating entry into an idle period, said method comprising:
   during said idle period, operating said clock data recovery circuitry in a mode in which said clock data recovery circuitry toggles between a lock-to-data state and a lock-to-reference state;
   asserting a synchronization signal upon receipt of data following said idle period;
   in each lock-to-data interval during toggling of said clock data recovery circuitry, checking for assertion of said synchronization signal; and
   in absence of said synchronization signal during said lock-to-data interval, continuing said toggling of said clock data recovery circuitry, and on detection of said synchronization signal discontinuing toggling of said clock data recovery circuitry and maintaining said clock data recovery circuitry in said lock-to-data state.

2. The method of claim 1 further comprising initiating said mode upon receipt of said signal indicating entry into said idle period.

3. The method of claim 2 wherein said initiating comprises waiting for passage of a latency interval after receipt of said signal indicating entry into said idle period, to allow propagation of data already in said interface.

4. The method of claim 3 wherein said latency interval has a programmable duration.

5. The method of claim 1 wherein said lock-to-data interval has a programmable duration.

6. The method of claim 1 wherein said asserting a synchronization signal comprises awaiting receipt of a number of repetitions of a predetermined data pattern and asserting said synchronization signal after receipt of said number of repetitions of said predetermined data pattern.

7. The method of claim 6 wherein said number of repetitions is programmable.

8. A serial interface for use in a programmable integrated circuit device, said serial interface operating under a serial communications protocol that includes a signal indicating entry into an idle period, and comprising clock data recovery circuitry, wherein:
   said clock data recovery circuitry operates, during said idle period, in a power mode in which said clock data recovery circuitry toggles between a lock-to-data state and a lock-to-reference state;
   said serial interface asserts a synchronization signal upon receipt of data following said idle period;
   in each lock-to-data interval during toggling of said clock data recovery circuitry, said clock data recovery circuitry checks for assertion of said synchronization signal; and
   in absence of said synchronization signal during said lock-to-data interval, said clock data recovery circuitry continues said toggling, and on detection of said synchronization signal said clock data recovery circuitry discontinues said toggling and remains in said lock-to-data state.

9. The serial interface of claim 8 wherein said clock data recovery circuitry initiates said mode upon receipt of said signal indicating entry into said idle period.

10. The serial interface of claim 9 wherein, before initiating said mode, said clock data recovery circuitry waits for passage of a latency interval after receipt of said signal indicating entry into said idle period, to allow propagation of data already in said serial interface.

11. The serial interface of claim 10 wherein said latency interval has a programmable duration.

12. The serial interface of claim 8 wherein said lock-to-data interval has a programmable duration.

13. The serial interface of claim 8 wherein said serial interface asserts said synchronization signal after receiving a number of repetitions of a predetermined data pattern.

14. The serial interface of claim 13 wherein said number of repetitions is programmable.

15. The serial interface of claim 8 wherein said clock data recovery circuitry comprises a controller that directs said mode, including directing said toggling, said checking, said continuing and said discontinuing.

16. A programmable integrated circuit device comprising the serial interface of claim 8.

17. The programmable integrated circuit device of claim 16 wherein said clock data recovery circuitry comprises a controller that directs said mode, including directing said toggling, said checking, said continuing and said discontinuing.

18. The programmable integrated circuit device of claim 17 wherein said controller is implemented in programmable logic of said programmable integrated circuit device.

19. The programmable integrated circuit device of claim 17 wherein said programmable integrated circuit device is a programmable logic device.

20. A digital processing system comprising:
   processing circuitry;
   a memory coupled to said processing circuitry; and
   a programmable integrated circuit device as defined in claim 16 coupled to the processing circuitry and the memory.

21. A printed circuit board on which is mounted a programmable integrated circuit device as defined in claim 16.

22. The printed circuit board defined in claim 21 further comprising:
  memory circuitry mounted on the printed circuit board and coupled to the programmable integrated circuit device.

23. The printed circuit board defined in claim 22 further comprising:
  processing circuitry mounted on the printed circuit board and coupled to the memory circuitry.

24. A method of operating clock data recovery circuitry in a serial interface of a programmable integrated circuit device, wherein said serial interface operates under a serial communications protocol that includes a signal indicating entry into an idle period, said method comprising:
  during said idle period, operating said clock data recovery circuitry in a mode in which said clock data recovery circuitry toggles between a lock-to-data state and a lock-to-reference state;
  in each lock-to-data interval during toggling of said clock data recovery circuitry, checking for receipt of data following said idle period; and
  in absence of said receipt of data during said lock-to-data interval, continuing said toggling of said clock data recovery circuitry, and on detection of said receipt of data discontinuing toggling of said clock data recovery circuitry and maintaining said clock data recovery circuitry in said lock-to-data state.

25. The method of claim 24 wherein said checking for receipt of data comprises checking for receipt of a number of repetitions of a predetermined data pattern.

* * * * *